United States Patent [19]

Gurewitsch et al.

[11] 4,184,302
[45] Jan. 22, 1980

[54] BONDED ASSEMBLY

[75] Inventors: Anatole M. Gurewitsch, Schenectady, N.Y.; Robert W. Weidemann, St. Louis, Mo.

[73] Assignee: Swiss Aluminium Ltd., Chippis, Switzerland

[21] Appl. No.: 896,828

[22] Filed: Apr. 17, 1978

[51] Int. Cl.² ............................................. F16B 5/00
[52] U.S. Cl. ....................................... 52/582; 403/305; 52/464
[58] Field of Search ............... 403/314, 312, 310, 305, 403/306, 309, 313, 311, 300; 285/373, 369; 52/464, 582, 780, 772

[56] References Cited

U.S. PATENT DOCUMENTS

| 157,427 | 12/1874 | Stuart | 403/312 |
|---|---|---|---|
| 1,806,687 | 5/1931 | Hoover | 403/312 |
| 1,951,220 | 3/1934 | Tarr | 403/312 |
| 2,160,694 | 5/1939 | Buchanan | 403/314 X |
| 2,383,692 | 8/1945 | Smith | 285/369 X |
| 2,808,136 | 10/1957 | Hammitt et al. | 52/772 X |
| 2,822,588 | 2/1958 | West | 52/582 X |
| 2,845,701 | 8/1958 | Daigle | 403/310 X |
| 2,869,339 | 1/1959 | Drake | 403/306 X |
| 3,182,423 | 5/1965 | Jennings | 52/780 X |
| 3,267,631 | 8/1966 | Hammitt | 52/772 X |
| 3,362,739 | 1/1968 | Staeger et al. | 52/582 X |
| 3,632,149 | 1/1972 | Konig | 52/582 |
| 3,692,336 | 9/1972 | Van Zon | 285/369 X |
| 3,818,669 | 6/1974 | Moss | 52/582 |

FOREIGN PATENT DOCUMENTS 372453 11/1963 Switzerland ............... 52/772

*Primary Examiner*—Andrew V. Kundrat
*Attorney, Agent, or Firm*—Bachman and LaPointe

[57] ABSTRACT

The disclosure teaches a firmly joined composite applicable for joining objects of various shapes, including flat plates, curved plates, cylindrical objects, pipes and rods of circular and other than circular cross section. The joined composite is simple to prepare and can be made hermetically tight if desired.

12 Claims, 9 Drawing Figures

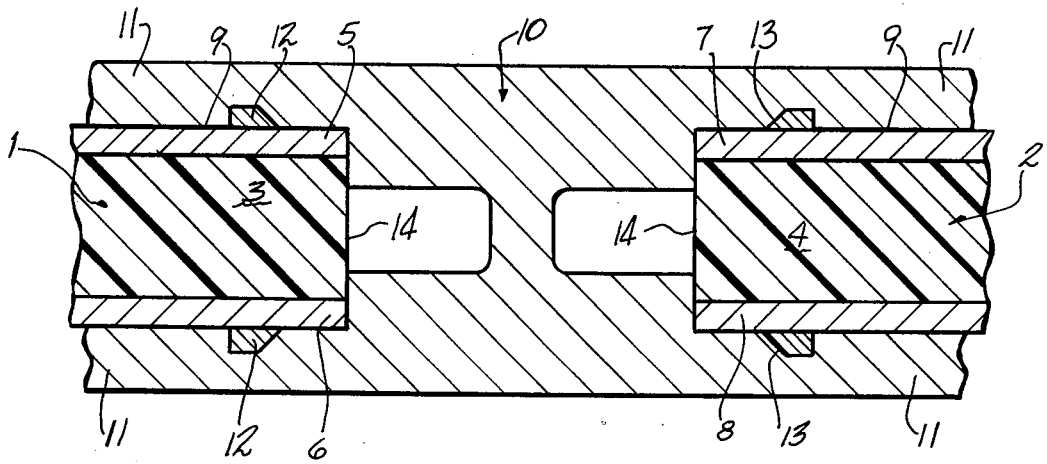

BONDED ASSEMBLY

BACKGROUND OF THE INVENTION

The present invention relates to a joined composite which is suitable for use with a wide variety of materials, including flat plates, curved plates, cylindrical objects, pipes and rods of circular and other than circular cross section. The present invention is particularly suitable for use in relation to sheet like metal-plastic laminates each of which has a plastic layer and two metal layers bonded to each side of the plastic layer.

Laminates of this type are known in the art and have a wide variety of highly advantageous uses. The material is relatively inexpensive and yet is a unique composite capable of taking on the various and infinite shapes of plastic, yet having strength and lightness particularly when the metal layers are light metals such as aluminum. Composites of this type may be used in such diverse applications as building facing panels, building interior wall and ceiling panels, tunnel interiors, signs, kiosks, display cubes, desks, chairs and even consumer products, such as table tennis tops. It can be readily appreciated that it is highly desirable to join such metal-plastic laminates together in an inexpensive and convenient manner, particularly in such a way that enables easy disassembly while providing a hermetically tight joint if desired.

Methods for joining panels of this type include conventional joining procedures, such as screwing, riveting or gluing. Each of these methods suffers from one or more significant disadvantages, such as poor strength properties, inconvenient disassembly, failure to provide hermetically tight joints, or external screws or rivets which detracts from the esthetic appearance of the assembly.

Accordingly, it is a principal object of the present invention to provide a firmly joined composite which is suitable for use in a wide variety of products of diverse configurations.

It is a still further object of the present invention to provide joined metal-plastic laminates.

It is an additional object of the present invention to provide a joined product as aforesaid which is simple and convenient to make, which is easy to disassemble and which can be made hermetically tight if desired.

Further objects and advantages of the present invention will appear hereinbelow.

SUMMARY OF THE INVENTION

In accordance with the present invention, it has now been found that the foregoing objects and advantages may be readily obtained.

The firmly joined composite of the present invention comprises: two objects to be joined each of which has external surfaces and adjacent edge portions; a joining member having extended arms engaging said external surfaces of both of said objects; and retaining members between at least a portion of the engaging surfaces of said extended arms and external surfaces to provide a firm joint between said joining member and external surfaces. Preferably, the objects to be joined are sheet like metal-plastic laminates each of which has a plastic layer and two metal layers bonded to each side of the plastic layer. However, the present invention is suitable for use in joining objects of a wide variety of shapes and configurations such as flat plates as aforesaid, or curved plates, cylindrical objects, pipes and rods of circular and other than circular cross section. As indicated hereinabove, the joints can be made hermetically tight if desired. Also, the assembly is simple and convenient to make and can be made so that disassembly is easy and convenient to perform. The joining member is preferably an H shaped clamp having a grooved inner surface adjacent the external surfaces of said objects wherein said sealing members comprise wedge like retainers bonded to said external surfaces seated in said grooves. Several variations of the present invention can be easily and conveniently provided within the spirit of the present invention.

It can be readily seen that the joined composite of the present invention is simple and easy to obtain and provides a firmly joined composite which is versatile and adaptable to a wide variety of situations. Furthermore, the joined composite of the present invention obtains several advantages such as those which have been described hereinabove and others which will appear from the ensuing specification.

DETAILED DESCRIPTION OF PREFERRED EMBODIMENTS

Figure 1:
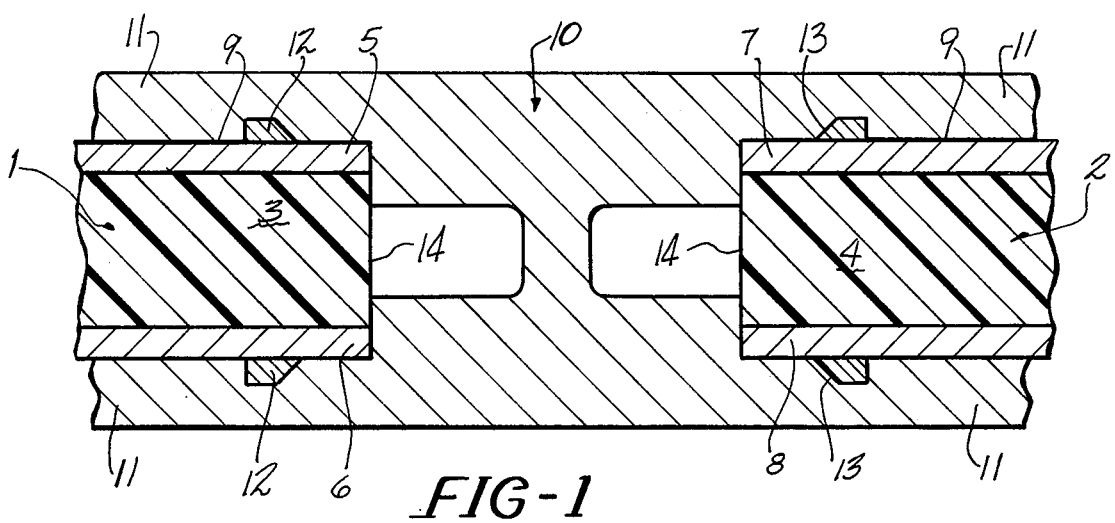
FIG. 1 is a cross section through a joined composite of the present invention utilizing two sheet like metal-plastic laminates.

FIG. 1 shows two sheet like metal-plastic laminates 1 and 2. Each laminate has a plastic layer 3 and 4 and two metal layers 5 and 6 and 7 and 8, respectively, bonded to each side of each plastic layer. Also, each of said laminates is provided with external surfaces 9 for receiving the joining member to be described hereinbelow.

As indicated hereinabove, the preferred embodiment of the present invention utilizes sheet like metal-plastic laminates as shown in FIG. 1. A wide variety of plastic materials may be utilized in the plastic layer, such as polyethylene, polyvinyl chloride or a polyester generally. The thickness of the plastic layer is not particularly critical, although the plastic layer generally will have a thickness varying from 0.01 to 1.0″. Similarly, any desired metal sheet may be used for the metal layer. Preferably the metal layer is a light, strong metal sheet such as aluminum. However, other metal sheets may, of course, be employed depending upon the particular use desired, such as magnesium, copper, steel or the like. Similarly, the thickness of the metal sheet is not particularly critical. Generally, the metal sheet has sufficient thickness to provide the desired stiffness properties for the particular application. The metal sheet, for example, may generally have a thickness of from about 0.005 to 0.20″. Also, the metal sheet may be colored or textured or provided with a desired surface appearance for the particular applicatiion. For example, if aluminum is used as the metal layer, the surface thereof may be provided with a colored anodized surface layer for desired esthetic appearance.

As can be seen in FIG. 1, joining member 10 is an H shaped clamp having four extended arms which are parallel members 11 extending towards objects 1 and 2 and engaging external surfaces 9. Retaining members 12 are provided between at least a portion of the engaging surfaces of said arms 11 and external surfaces 9 to provide a firm joint between joining member 10 and the external surfaces 9. In the embodiment shown in FIG. 1, the joining member 10 has a grooved inner surface 13 adjacent the external surfaces 9 wherein retaining or sealing members 12 comprise wedge like retainers bonded to the external surfaces 9 and seated in said grooves 13. As can be seen in FIG. 1, the retainers 12 are bonded to external surfaces 9 and are spaced inwardly of the edge portions 14 of objects 1 and 2, respectively. Any convenient material may be used for the retainers, such as metal, plastic, etc.

The joining operation is very simple and convenient to accomplish. The arms 11 of clamp 10 are simply pushed onto the external surfaces 9. During insertion, the arms spread due to their elasticity and then snap back into their original shape when the retainers 12 are lined up with the corresponding grooves 13 on the inside of arms 11. The wedge like shape of retainers 12 and the bevelled edges of grooves 13 facilitate the insertion operation and make withdrawal of the plates extremely difficult. In some applications the forces between the joined plates will not be very large. In such cases it may not be necessary to use continuous retainers 12. Instead, the retainers may have a short discrete dimension and a plurality of retainers may be provided if desired.

Depending upon particular requirements, the basic composite illustrated in FIG. 1 can be modified in many ways. Some typical variations are described in the succeeding drawings wherein like parts are given like numerals.

Figure 2:
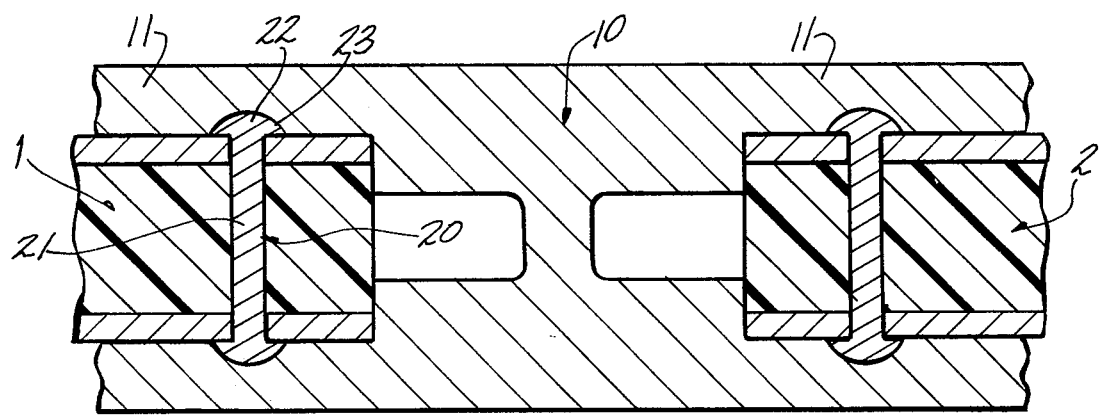
FIGS. 2, 3, 4, 5 and 6 are cross-sectional views similar to FIG. 1 showing variations in the composite of the present invention.

FIG. 2 represents a composite similar to FIG. 1 illustrating a variation wherein a plurality of short retainers 20 may be employed. The retainers shown in FIG. 2 represent rod like members 21 inserted completely through laminates 1 and 2, with the rod like members being provided with curved heads 22 as retainers. A variation of the above, not shown, would be the use of screws or rods with appropriate head shapes inserted only from one side of the objects 1 and 2. Head 22 is received in grooved surface 23 on arms 11. Naturally, it can be appreciated that head 22 and corresponding grooved surface 23 can be of any desired shaped based on the particular requirements of the composite. Naturally, a plurality of these retaining members 20 may be readily employed in a particular composite. This embodiment is advantageous as it avoids the necessity of gluing the retaining member to the external surfaces.

Figure 3:
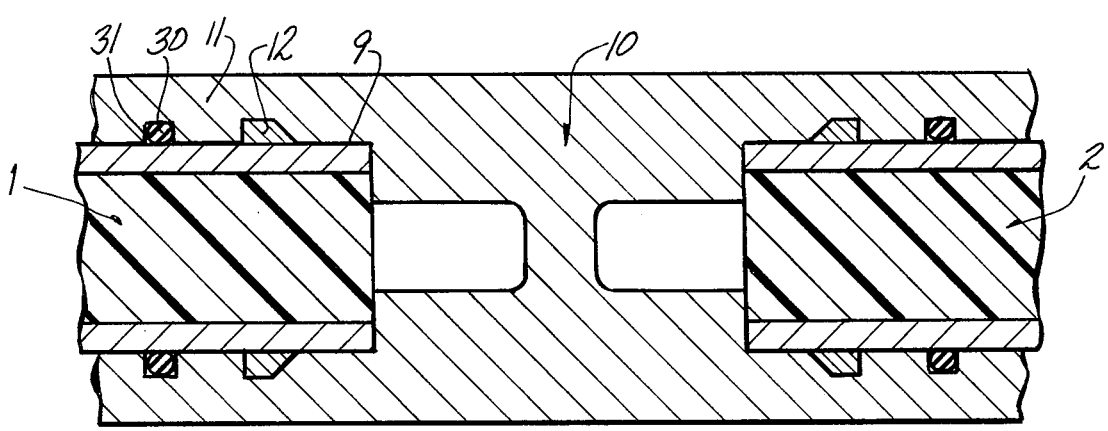

FIG. 3 shows a composite similar to FIG. 1 wherein the joint is to be both mechanically strong and hermetically tight. In accordance with this embodiment, an O ring type gasket 30 is provided on external surfaces 9 spaced inwardly from retainer 12 and seated in a corresponding groove 31 in arms 11.

Figure 4:
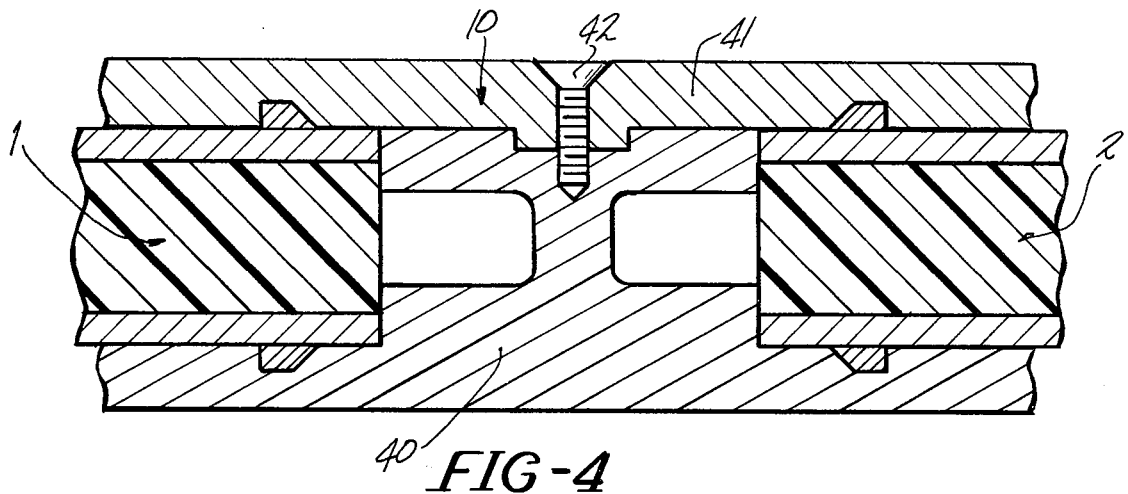

FIG. 4 shows an embodiment where it is necessary that the joint can be easily and conveniently disassembled. The embodiment of FIG. 4 is similar to FIG. 1 with the provision that joining member 10 is a two piece member having a relatively larger lower section 40 and a relatively smaller plate like upper section 41. Plate like upper section 41 is removably bonded to lower section 40 by means of screws 42 or other desired means.

Figure 5:
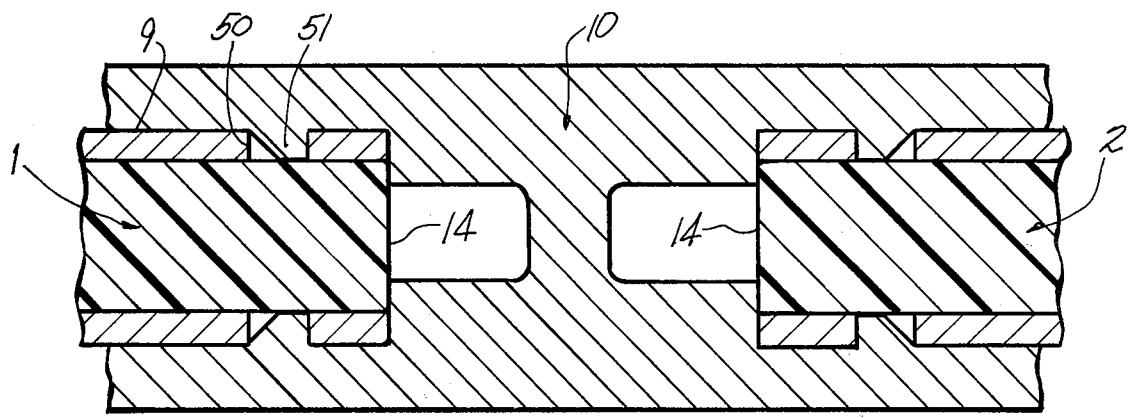
Figure 6:
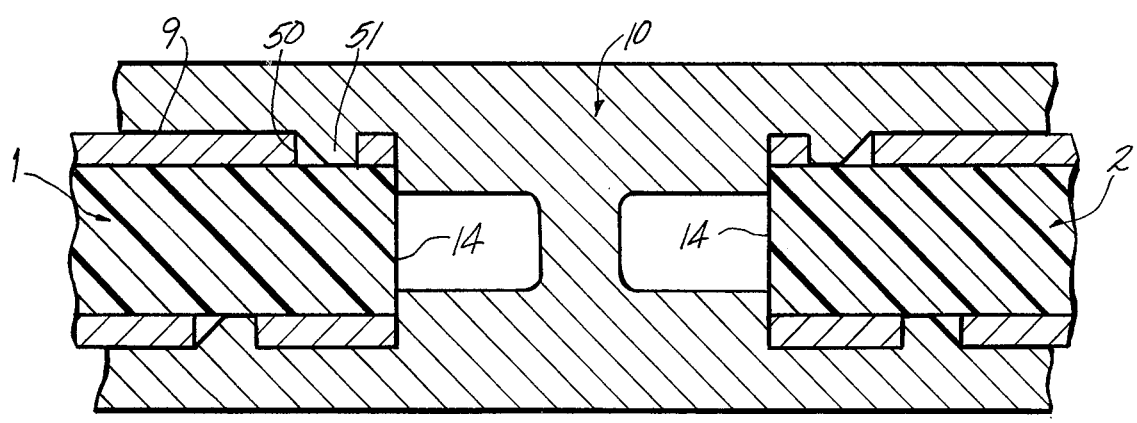

FIG. 5 shows a further embodiment eliminating the need for gluing or bonding the sealing members to the external surfaces. In the embodiment of FIG. 5, grooves 50 are cut into external surfaces 9 and a wedge like sealing or retaining member 51 is provided on the inner surface of arms 11. Naturally, the depth of grooves 50 may be varied as desired. The sealing member 51 snaps into place in a manner after the embodiment of FIG. 1 to assure a good mechanical joint. Thus, it can be seen in accordance with the embodiment of FIG. 5, the retaining members 51 are integral with arms 11 and are seated in grooves 50 in external surfaces 9. Naturally, it can be appreciated that O ring type or other gaskets can also be provided in this or any embodiment similar to the embodiment of FIG. 3. Also, as shown in FIG. 6, the retaining members can be offset with one retaining member being spaced inwardly of the other. In accordance with the embodiments of FIGS. 5 and 6, retaining members 51 can be provided having a greater depth than grooves 50 so that the retaining members will compress the plastic core of the metal-plastic laminates and act in a manner similar to an O ring type gasket. Also, by offsetting the retaining members as shown in FIG. 6 and by placing the retaining members at slightly different distances from end portions 14, the strength of the composite can be somewhat increased.

Figure 7:
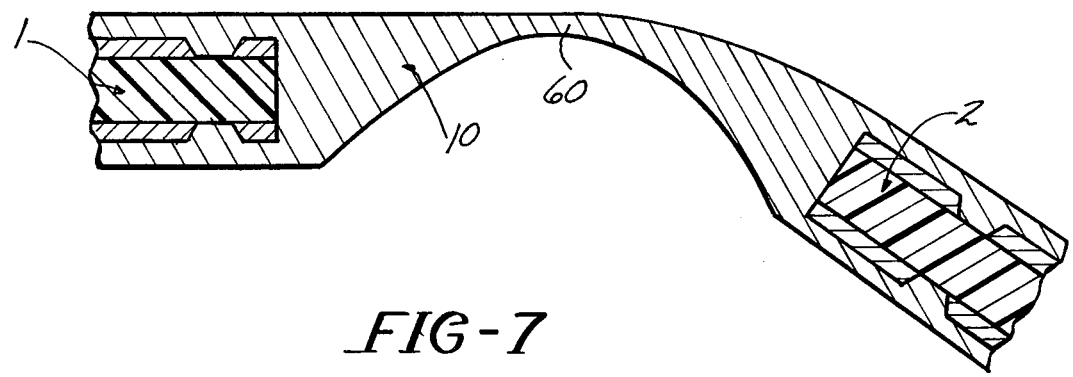
FIG. 7 is a cross-sectional view similar to FIG. 1 showing a variation in the composite of the present invention wherein the bonding members can be oriented in different directions.

FIG. 7 represents an embodiment similar to FIG. 5 wherein the joining member has a large central portion 60 which can be bent as shown in FIG. 7 so that the orientation of the joining member 1 and 2 may be variable if desired. Naturally, the embodiment of FIG. 7 can be applied to any of the embodiments herein. Similarly, the feature of offsetting the sealing members can also be applied to any of the embodiments herein.

Figure 8:
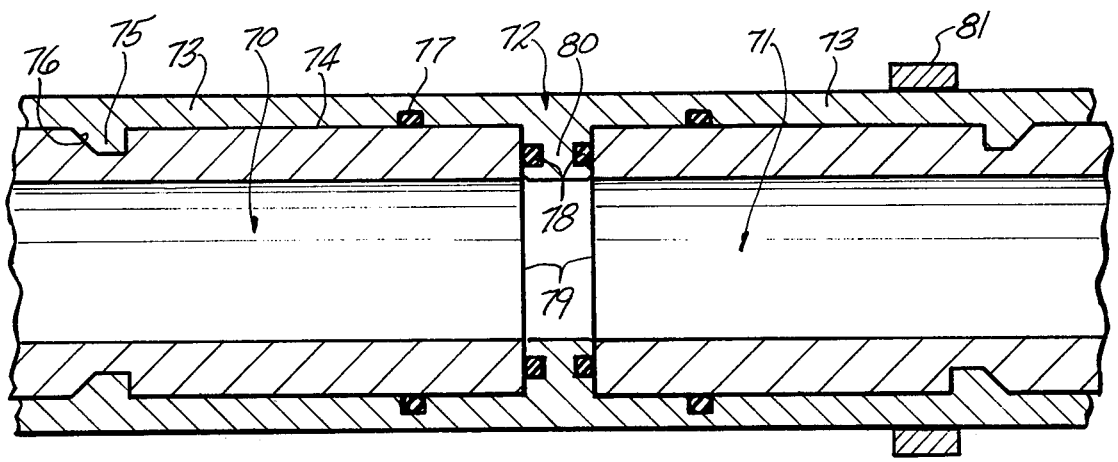
FIGS. 8 and 9 are cross-sectional views similar to FIG. 1 showing a bonded composite of the present invention utilizing tube like objects instead of sheet like metal-plastic laminates.
Figure 9:
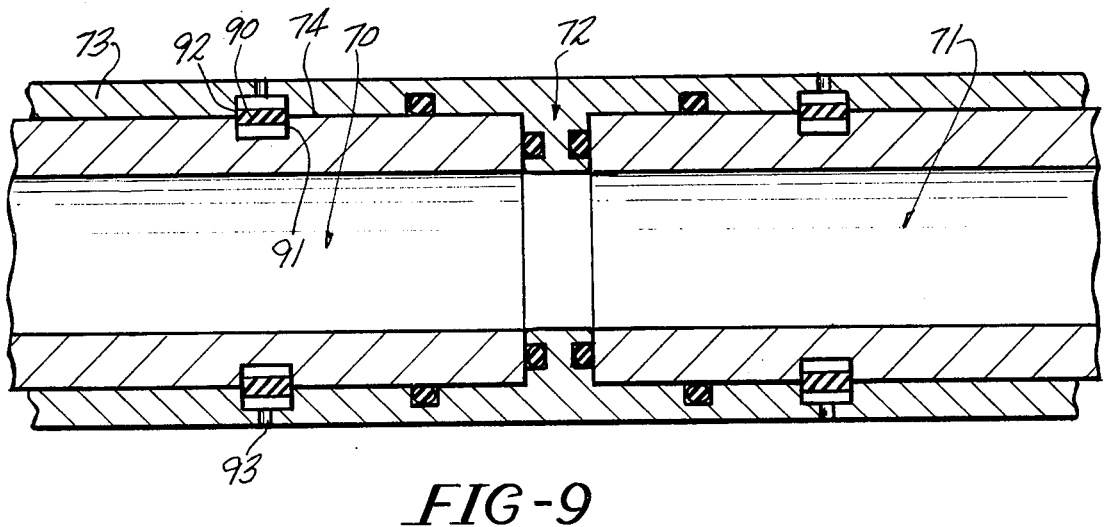

As indicated hereinabove, pipes and rods can be joined using the concepts of the present invention. This is illustrated in FIGS. 8 and 9. In accordance with FIGS. 8 and 9, the objects to be joined are hollow pipe like members 70 and 71, although solid rods may also be joined. Joining member 72 should preferably have a corresponding annular shape and is provided with extended arms 73 engaging external surfaces 74 of objects 70 and 71. Retaining members 75 are provided between at least a portion of the engaging surfaces of extended arms 73 and external surfaces 74 to provide a firm joint between the joining member and the external surfaces. As shown in FIG. 8, the retaining member is integral with said extended arms and is seated in grooves 76 in said external surfaces 74 in a manner after the embodiment of FIGS. 5 and 6. O ring type gaskets 77 can be provided between extended arms 73 and external surfaces 74. Alternatively, additional O ring type gaskets 78 may be provided between edge portions 79 and descending arms 80 of joining member 72 in order to provide a still tighter hermetic seal.

Extended arms 73 may be simply snapped in place by providing same with sufficient flexibility to ride over external surfaces 74. If desired, the joint can be further strengthened by a clamp ring 81 or the like. Naturally, other methods of assembling the joint may be readily provided, such as by making the extended arms 73 movable as by providing a hinge joint thereon and subsequently including a clamp ring or the like to strengthen the joint. Alternatively, one may provide one or more axial slots on either the tube or pipe and/or on the joining member in order to reduce the diameter of the slotted component while the joining member is being put in place.

A variation of the pipe or rod joint shown in FIG. 8 is provided by the embodiment of FIG. 9 wherein the retaining member comprises a ring like member 90 seated in a mating groove 91 in the external surfaces 74 and groove 92 seated in the underside of said extended arm 73. A corresponding groove or hole 93 can be provided in the extended arm for insertion of a pin (not shown) to depress retainer 90 making it possible to easily remove the pipe or rod 70 from clamp 72. Also, rotation of the pipe in the clamp can easily be prevented in a number of ways if necessary. For example, a radial slot (not shown) can be easily provided at the end of the pipe which fits into a corresponding ridge in the clamp.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A firmly joined composite which comprises: two sheet-like objects to be joined each of which has flat external surfaces and adjacent edge portions; an H shaped joining member having a substantially flat external configuration, a central portion adjacent said edge portions and having extended arms emanating from said central portion engaging each of said external surfaces of both of said objects; and retaining members between and engaging at least a portion of each of the engaging surfaces of said extended arms and having a band with said external surfaces and seated in at least one of said engaging surfaces to form a direct bond between each of the engaging surfaces of said arms and external surfaces to provide a firm joint between the joining members and external surfaces.

2. A composite according to claim 1 wherein each of said objects comprises sheet like metal-plastic laminates, wherein each of said laminates has a plastic layer and two metal layers bonded to each side of the plastic layer.

3. A composite according to claim 2 wherein said plastic layer has a thickness from 0.01 to 1.0" and wherein said metal layers have a thickness of from 0.005 to 0.20".

4. A composite according to claim 1 wherein said joining member is an H shaped clamp having a grooved inner surface adjacent the external surface of said objects, wherein said retaining members comprise wedge like retainers bonded to said external surfaces and seated in said grooves.

5. A composite according to claim 1 wherein said extended arms are connected by a connecting portion of said joining member.

6. A composite according to claim 1 including at least one O ring type gasket on said external surfaces seated in corresponding grooves in said extended arms spaced inwardly from said edge portions.

7. A composite according to claim 1 wherein said joining member is a two piece member removably joined together.

8. A composite according to claim 1 wherein said retaining members are integral with said extended arms and are seated in grooves in said external surfaces.

9. A composite according to claim 1 wherein said retaining members are offset from each other.

10. A firmly joined composite which comprises: two tube or rod-like objects to be joined each of which has external surfaces and adjacent edge portions; a joining member having extended arms engaging said external surfaces of both of said objects; and retaining members between at least a portion of the engaging surfaces of said extended arms and external surfaces to provide a firm joint between the joining members and external surfaces, wherein said retaining member comprises a rod like member inserted into said objects with an external retaining head on said external surfaces seated in corresponding grooves on the inside of said extended arms.

11. A composite according to claim 10 wherein said joining member has an annular shape corresponding to the shape of said objects.

12. A firmly joined composite which comprises: two sheet-like objects to be joined each of which has flat external surfaces and adjacent edge portions; a joining member having extended arms engaging said external surfaces of both of said objects; and retaining members between at least a portion of the engaging surfaces of said extended arms and external surfaces to provide a firm joint between the joining members and external surfaces, wherein said retaining member comprises a rod like member inserted into said objects with an external retaining head on said external surfaces seated in corresponding grooves on the inside of said extended arms.

* * * * *